United States Patent

Mareno et al.

[11] Patent Number: 5,867,773
[45] Date of Patent: Feb. 2, 1999

[54] MODULAR ASSEMBLY FOR CENTRALLY LOCATING CELLULAR TELEPHONE ACCESSORY CONNECTIONS

[75] Inventors: Jason Donald Mareno; Patrik H. Lilja, both of Raleigh; Thomas Joseph Karpus, Apex, all of N.C.

[73] Assignee: Ericsson Inc., Research Development Park, N.C.

[21] Appl. No.: 762,606

[22] Filed: Dec. 9, 1996

[51] Int. Cl.[6] ....................................................... H04Q 7/32
[52] U.S. Cl. ............................ 455/90; 455/575; 379/439; 379/446; 379/447; 379/455
[58] Field of Search ...................... 455/90, 575; 379/446, 379/447, 455, 454, 439; 361/601, 625, 636, 640; D14/251, 256, 149, 142

[56] References Cited

FOREIGN PATENT DOCUMENTS

| 0 370 759 | 11/1989 | European Pat. Off. . |
| 296 16 889 | 3/1997 | European Pat. Off. . |
| WO 94/24775 | 10/1994 | WIPO . |

OTHER PUBLICATIONS

PCT, Search Report, Apr. 17, 1998, PCT US 97/21738.

Primary Examiner—Wellington Chin
Assistant Examiner—Keith Ferguson
Attorney, Agent, or Firm—Jenkens & Gilchrist

[57] ABSTRACT

A modular assembly for centrally locating electrical connections of cellular telephone accessories to a cellular telephone near a cellular telephone cradle. An adapter module containing electronics for effectuating the connections is located and mounted beneath the cellular telephone cradle. The adapter contains a plurality of connections for connecting to the cellular telephone accessories.

7 Claims, 2 Drawing Sheets

MODULAR ASSEMBLY FOR CENTRALLY LOCATING CELLULAR TELEPHONE ACCESSORY CONNECTIONS

BACKGROUND OF THE INVENTION

1. Technical Field of the Invention

The present invention pertains in general to devices for mounting cellular telephone cradles to automobiles, and more particularly, to an adaptor module attached to a cellular telephone cradle for electrically connecting cellular telephone accessories to a cellular telephone.

2. Description of Related Art

Increasingly, cellular telephone accessories such as speaker phones, auxiliary handsets, and modems are being connected to cellular telephones. In addition, hand-held cellular telephones are frequently placed in a cradle or docking station when used in an automobile. These cradles allow hand-held cellular telephones to use hands free speakerphone equipment, vehicle power supplies, externally mounted antenna, and auxiliary transmitters having greater transmitting output power than the hand held cellular telephone transmitter. In the past, the use of cellular telephone accessories and the use of a cradle were mutually exclusive activities with the user having to choose between placing the hand-held cellular telephone in the cradle or attaching a cellular telephone accessory directly to the cellular telephone. To address this problem, the cellular telephone cradle and various cellular telephone accessories can be connected to each other via an interface system which connects and arbitrates between the various components. While such an interface system allows the various components to interface with one another, connections to the interface system are cumbersome and spread about the vehicle or located in inconvenient locations. It would be advantageous, therefore, to devise a modular assembly which centrally locates connections between the cellular telephone and the various cellular telephone accessories to a position near the cellular telephone cradle. Furthermore, it would be advantageous for the modular assembly to be easily mounted to a mounting surface together with a standard cellular telephone cradle.

SUMMARY OF THE INVENTION

The present invention comprises an adapter module which facilitates the electrical connection of various cellular telephone accessories to a cellular telephone. The adapter module includes a housing containing a plurality of thru-holes which align with the thru-holes of a standard cellular telephone cradle mount plate used for mounting cellular telephone cradles to fixed surfaces. The adapter module is mounted between the cellular telephone cradle mount plate and the fixed surface thereby allowing connections to various cellular telephone accessories to be centrally located near the cellular telephone cradle. The adapter module contains electrical connectors for making connection to cellular telephone accessories and to a controller.

BRIEF DESCRIPTION OF THE DRAWINGS

For a more complete understanding of the present invention, reference is made to the following detailed description taken in conjunction with the accompanying drawing wherein.

DETAILED DESCRIPTION OF THE INVENTION

The present invention incorporates by reference U.S. pat. application Ser. No. 08/706,660, entitled "Interface System for Providing Hands-Free Operation of a Radio Telephone and Accessories in a Mobile Office Environment," (filed Sep. 6, 1996; Thomas J. Karpus and Patrick H. Lilja, Inventors; Attorney Docket No. 27951–00097).

Figure 1:
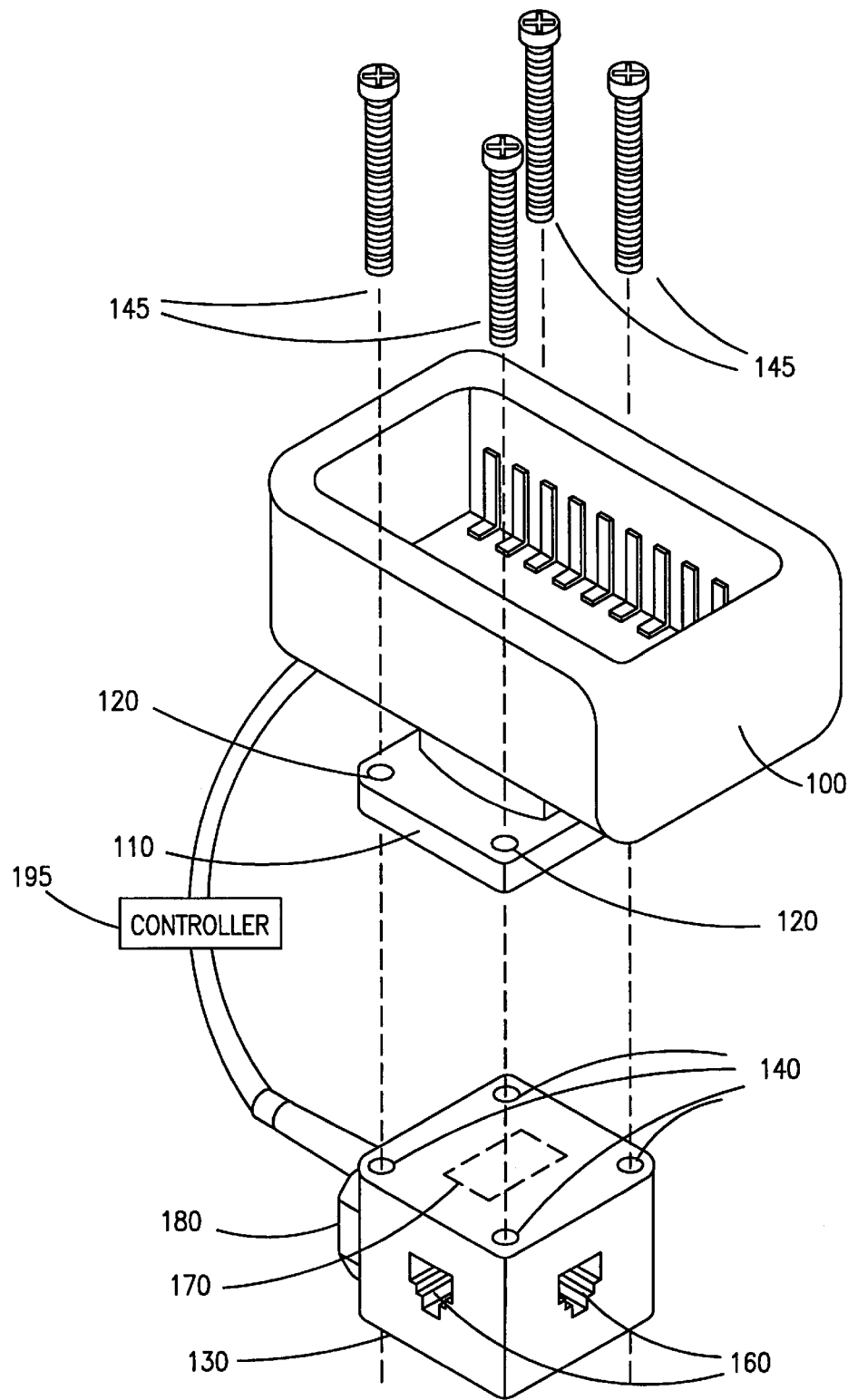
FIG. 1 is an exploded perspective view of a cellular telephone cradle having a standard cradle mount plate and an adapter module having multiple cellular telephone accessory connectors.

Referring now to FIG. 1, there is illustrated a cellular telephone cradle 100 including a standard cradle mount plate 110. The mount plate 110 includes a plurality of thru-holes 120 for mounting the cellular telephone cradle mount plate 110 to a mounting surface (not shown, for example, in an automobile).

FIG. 1 further illustrates an adapter modular 130 having a plurality of thru-holes 140. The plurality of thru-holes 140 are positioned to correspond to and align with the plurality of thru-holes 120 of the mount plate 110. When mounting the cradle mount plate 110 and the adapter module 130 to a mounting surface, the cradle mount plate 110 is placed over the adapter module 130 with the plurality of thru-holes 120 aligning with the plurality of thru-holes 140. Fastening devices, including but not limited to, screws and bolts 145 are inserted through the aligned plurality of thru-holes 120 and 140 to secure the cradle mount plate 110 and the adapter module 130 to the mounting surface.

The adapter module 130 further includes a plurality of connectors 160 for effectuating electrical connections to cellular telephone accessories such as a speaker phone, modem, and an auxiliary handset. The adapter module 130 also contains internal electronics 170 including a switch for connecting the cellular telephone accessories to the cellular telephone. The electronics are under the control of a controller 195 which determines which accessory is to be connected to the cellular telephone. An electrical path is created from the accessories through the connectors 160, through the electronics 170, through a data connector 180, through the controller 195, to the cellular telephone docking cradle 100 which connects to the cellular telephone.

Figure 2:
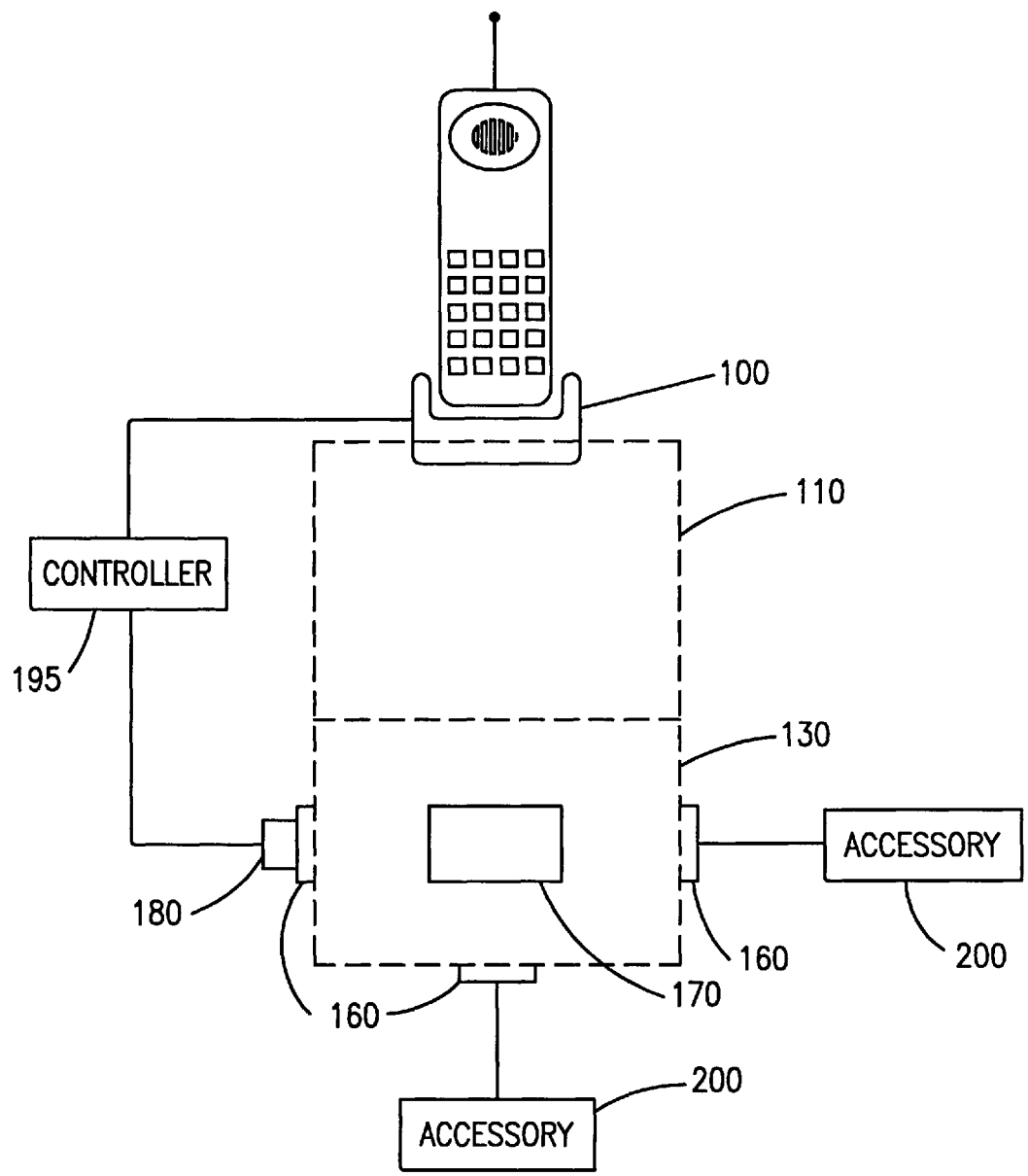
FIG. 2 is a block diagram illustrating the electrical connections between various cellular telephone accessories and a cellular telephone cradle.

Referring additionally now to FIG. 2, there is illustrated a block diagram illustrating the electrical connections between various cellular telephone accessories and a cellular telephone cradle. Each accessory 200 is electrically connected to the electronics 170 via the connectors 160 which are integral to the adapter module 130. The electronics 170, which is under the control of the controller 195, is connected to the controller 195 via a data connector 180. The controller 195, in turn, is electrically connected to the cellular telephone cradle 100.

When the cradle mount plate 120 and adapter module 130 are secured to a mounting surface, connections between cellular telephone accessories and the cellular telephone are centrally located beneath the cellular telephone cradle 100. This central location allows for easy access by a cellular telephone user to not only the cellular telephone but to the various accessory connections for access to the cellular telephone.

Although the preferred embodiment of the apparatus of the present invention have been illustrated in the accompanying Drawing and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A modular assembly attached to a cellular telephone mount plate for making electrical connections of cellular telephone accessories to a cellular telephone cradle, the mount plate having a plurality of thru-holes for mounting the mount plate to a mounting surface, comprising:

an adapter module for positioning between the mount plate and the mounting surface, the adapter module including a plurality of thru-holes substantially aligned with the corresponding thru-holes of the mount plate, the adapter module for electrically connecting cellular telephone accessories to the cellular telephone; and a plurality of fasteners extending through both the plurality of thru-holes of the mount plate and the plurality of thru-holes of the adapter module for fastening the cradle, mount plate, and adapter module to the mounting surface.

2. The modular assembly of claim 1 wherein the adapter module further includes electronics for effectuating connection of the cellular telephone accessories to the cellular telephone.

3. The modular assembly of claim 2 wherein the adapter module includes a connector for connecting a controller to the electronics.

4. The modular assembly of claim 1 wherein the adapter module further includes a plurality of connectors for effectuating connections to cellular telephone accessories.

5. The modular assembly of claim 4 wherein the adapter module includes at least one connector for connecting a modem to the cellular telephone.

6. The modular assembly of claim 4 wherein the adapter module includes at least one connector for connecting an auxiliary handset to the cellular telephone.

7. The modular assembly of claim 4 wherein the adapter module includes at least one connector for connecting a speaker phone to the cellular telephone.

* * * * *